(12) United States Patent
Kannler et al.

(10) Patent No.: US 9,983,640 B2
(45) Date of Patent: May 29, 2018

(54) ASSEMBLY FOR FIXING A PLUGIN UNIT IN AN INSTALLATION CAGE OF A COMPUTER SYSTEM AND METHOD OF PRODUCING AN ASSEMBLY

(71) Applicant: Fujitsu Technology Solutions Intellectual Property GmbH, München (DE)

(72) Inventors: Bernhard Kannler, Augsburg (DE); Michael Schmid, Dillingen (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days. days.

(21) Appl. No.: 15/346,915

(22) Filed: Nov. 9, 2016

(65) Prior Publication Data

US 2017/0131749 A1 May 11, 2017

(30) Foreign Application Priority Data

Nov. 11, 2015 (DE) .......................... 10 2015 119 461

(51) Int. Cl.
   *G06F 1/18* (2006.01)
(52) U.S. Cl.
   CPC .................................. *G06F 1/187* (2013.01)
(58) Field of Classification Search
   CPC ....................................................... G06F 1/187
   See application file for complete search history.

(56) References Cited

U.S. PATENT DOCUMENTS

| | | | | |
|---|---|---|---|---|
| 6,097,608 A | * | 8/2000 | Berberich | G11B 25/043 248/560 |
| 6,299,266 B1 | * | 10/2001 | Justice | G06F 1/184 292/87 |
| 6,304,457 B1 | * | 10/2001 | Liu | G06F 1/184 174/51 |
| 6,600,648 B2 | * | 7/2003 | Curlee | G06F 1/184 312/334.7 |
| 6,717,816 B1 | * | 4/2004 | Tanaka | G11B 5/4953 361/679.34 |
| 6,882,526 B2 | * | 4/2005 | Neukam | G06F 1/184 361/679.39 |
| 7,548,417 B2 | * | 6/2009 | Lai | G11B 33/08 361/679.36 |
| 7,616,436 B2 | * | 11/2009 | DeMoss | G06F 1/187 312/223.1 |

(Continued)

FOREIGN PATENT DOCUMENTS

DE    10 2009 033 289 A1    1/2011
DE    10 2013 105 552 A1    12/2014

*Primary Examiner* — Lisa Lea Edmonds
(74) *Attorney, Agent, or Firm* — DLA Piper LLP (US)

(57) ABSTRACT

An assembly for fixing a plugin unit in an installation cage of a computer system includes a holding rail with a support surface that fixes the holding rail in a guide rail of the installation cage; and two holding pins that engage in lateral fastening openings of the plugin unit and fix the guide rail to the plugin unit, wherein each holding pin is mechanically coupled with the holding rail via a damping element, and the assembly is formed integrally, wherein each damping element is molded to the corresponding holding pin and the holding rail in a non-detachable manner by an injection molding method.

9 Claims, 5 Drawing Sheets

(56) References Cited

U.S. PATENT DOCUMENTS

| | | | | |
|---|---|---|---|---|
| 7,697,278 B2* | 4/2010 | Peng | ............... | G06F 1/187 |
| | | | | 248/633 |
| 8,159,816 B2* | 4/2012 | Chen | ............... | G06F 1/187 |
| | | | | 206/701 |
| 8,159,817 B2* | 4/2012 | Lin | ............... | F16C 29/02 |
| | | | | 312/223.1 |
| 8,861,193 B1* | 10/2014 | Svenkeson | ............... | G06F 1/187 |
| | | | | 361/679.36 |
| 2003/0011974 A1* | 1/2003 | Curlee | ............... | G06F 1/184 |
| | | | | 361/679.34 |
| 2004/0070929 A1* | 4/2004 | Lin | ............... | G06F 1/184 |
| | | | | 361/679.35 |
| 2005/0088778 A1* | 4/2005 | Chen | ............... | G06F 1/184 |
| | | | | 360/97.19 |
| 2005/0168933 A1* | 8/2005 | Lee | ............... | G06F 1/184 |
| | | | | 361/679.36 |
| 2005/0237709 A1* | 10/2005 | Huang | ............... | G11B 33/08 |
| | | | | 361/679.36 |
| 2006/0018091 A1* | 1/2006 | Tu | ............... | G06F 1/184 |
| | | | | 361/679.02 |
| 2013/0048813 A1* | 2/2013 | Liu | ............... | G06F 1/187 |
| | | | | 248/222.11 |
| 2015/0117696 A1* | 4/2015 | Lee | ............... | F16F 15/085 |
| | | | | 381/392 |

\* cited by examiner

ASSEMBLY FOR FIXING A PLUGIN UNIT IN AN INSTALLATION CAGE OF A COMPUTER SYSTEM AND METHOD OF PRODUCING AN ASSEMBLY

TECHNICAL FIELD

This disclosure relates to an assembly for fixing a plugin unit in an installation cage of a computer system and to a method of producing such an assembly.

BACKGROUND

Figure 1:
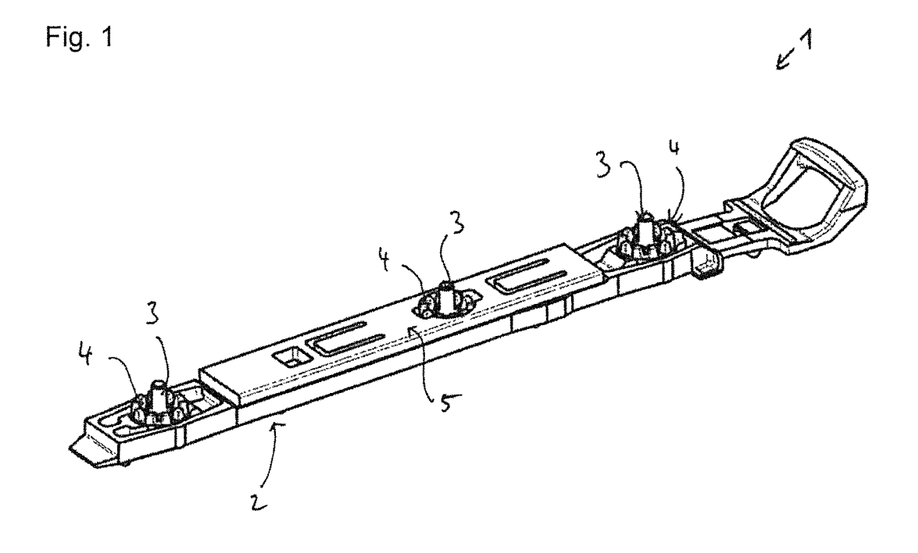
FIG. 1 shows a perspective view of an assembly for fixing a plugin unit in an installation cage according to the prior art.

Assemblies 1 are known from DE 10 2013 105 552 A1 as shown in FIG. 1. The assembly 1 comprises a holding rail 2 in which three holding pins 3 are inserted via one damping element 4. Inter alia, the assemblies 1 allow for an especially easy and fast installation and de-installation of plugin units, in particular of storage drives in a computer housing. A further longitudinal damping element 5 is arranged around the central holding pin 3 comprising a foam covered by a fabric. The holding pins 3 are provided to engage in lateral fastening openings of a hard disk drive. The damping elements 4 are cylindrical vibration dampers by which mechanical vibrations between the computer casing and the plugin unit are dampened.

Modern storage drives often only have two lateral fastening openings since, due to an increasing storage capacity, for example 6 TB (terabytes) and more, installation space is required so that the central holding pin 3 has to be omitted in the above described assembly 1.

It could therefore be helpful to provide an improved assembly as well as a method of producing such an assembly that contributes to an effective damping of vibration from or to a plugin unit.

SUMMARY

We provide an assembly for fixing a plugin unit in an installation cage of a computer system including a holding rail with a support surface that fixes the holding rail in a guide rail of the installation cage, and two holding pins that engage in lateral fastening openings of the plugin unit and fix the holding rail to the plugin unit, wherein each holding pin is mechanically coupled with the holding rail via a damping element, and the assembly is formed integrally, wherein each damping element is molded to the corresponding holding pin and the holding rail in a non-detachable manner by an injection molding method.

We also provide a method of producing the assembly for fixing a plugin unit in an installation cage of a computer system including a holding rail with a support surface that fixes the holding rail in a guide rail of the installation cage, and two holding pins that engage in lateral fastening openings of the plugin unit and fix the holding rail to the plugin unit, wherein each holding pin is mechanically coupled with the holding rail via a damping element, and the assembly is formed integrally, wherein each damping element is molded to the corresponding holding pin and the holding rail in a non-detachable manner by an injection molding method, including providing a two-part mold for the assembly, inserting two holding pins into a respective mold halve of the mold, closing the mold, displacing one or more sliders to form a first cavity in the mold defining a shape of a holding rail, injecting a first plastic material into the first cavity to produce the holding rail, displacing the one or more sliders to form two further cavities in the mold, each defining a shape of a damping element, and injecting a second plastic material in each further cavity to produce in each case one damping element, wherein each further cavity is formed such that a damping element produced therein forms a non-detachable connection to the respective hold pin and the holding rail.

LIST OF REFERENCE NUMERALS 1 assembly
2 holding rail
3 holding pin
4 damping element
5 further damping element
6 plugin unit
7 lateral surface
8 lateral fastening opening
9 latching lug
10 narrow side
11 lateral surface
12 handle element
13 guide tip
14 first damping portion
15 strand
16 second damping portion
17 edge
18 middle length axis
19 receiving area
20 fastening protrusion
21 undercut
22 web portion
23 peak
24 rotation symmetrical axis
25 breakthrough
S1 to S7 steps
A1-A1 sectional plane
P3-P3 sectional plane

DETAILED DESCRIPTION

We provide an assembly for fixing a plugin unit in an installation cage of a computer system, in particular a storage drive in a drive cage of a desktop PC. The assembly comprises a holding rail with a support surface for fixing the holding rail in a guide rail of the installation cage. Furthermore, two holding pins that engage lateral fastening openings of the plugin unit and fix the holding rail to the plugin unit are provided. Each holding pin is mechanically coupled to the holding rail via a damping element. Furthermore, the assembly is formed in one piece, wherein each damping element is molded to the corresponding holding pin and the holding rail in a non-detachable manner by an injection molding method.

The assembly provides a non-detachable connection between the holding pin, the damping element and the holding rail. In other words, the damping element connects to the holding pin and the holding rail such that the components will not detach from one another during normal operation of the assembly in a computer system. This means, for example, that the damping element only detaches from the holding rail and the holding pin under the impact of force.

The non-detachable connection of the damping element to the holding pin or the holding rail is at least mechanical, for example, in the form of back injections, for example, the injection of molding mass in undercuts. Alternatively, the connection of the damping element to each holding pin or holding rail may as well be of a physical or chemical type. A physical connection means, for example, that the damping element and the respective counterpart, i.e., holding pin and/or holding rail, have predefined textures or profiles. A chemical connection means, for example, that the damping element, due to its material, establishes a chemical connection to the holding pin and/or the holding rail. For example, such a chemical connection develops due to adhesive forces of the respective materials. As other alternatives, combinations of the three possible connection types can be provided.

The holding rail and/or the holding pins can be provided as separate elements so that the assembly after injection of the damping element becomes integral by the injection molding method.

The assembly allows for effective damping of vibrations and noises for the storage drives described above, which merely have two fastening openings for the holding pins of the assembly on opposite lateral surfaces. The assembly allows that even such storage drives are fixed in a mechanically-secured manner in the mounting cage.

The mechanically-secure fixing is necessary to pass a falling test, for example. In a such falling test, an assembly such as the computer system with a plugin unit, which is fixed in the installation cage via at least one assembly, for example, multiple times in various orientations, is dropped on a floor. Pulse forces of up to 80 G act within a short time. In a detachable connection of the damping element with the holding rail, such forces would lead to the fact that the holding pin and/or the damping element fall out of the holding rail. We discovered that a detachable connection between the holding pin and the damping element and/or between the damping element and the holding rail cannot be ensured with sufficient safety, that a falling test would be passed.

Another advantage of the assembly is that an additional damping element, for example, in the form of a foam part, can be dispensed with.

The assembly is particularly suitable for damping vibrations generated by the plugin unit. The plugin unit is, for example, a magnetic storage drive that generates mechanic vibrations during operation. Hard drive disks of the storage drive that rotate during operation constitute a considerable rotational mass (energy). Hard drive disks typically also have imbalances contributing to the mechanic vibrations. Above all, due to the increasing capacities of the hard drive disks, for example, 6 TB and more, impact of the imbalance increases as the number of disks has to be increased. As the assembly provides for a non-detachable connection, that oscillations and vibrations can particularly well be dampened or respectively absorbed.

A further advantage is that in plugin units in the form of hard drive disks, the reading and writing performance can be increased. By damping mechanic oscillations and/or vibrations, fewer reading or writing errors are produced in such hard disk drives. Due to the (meanwhile) common, very high speeds and writing densities in magnetic and optical storage drives, positioning of the reading and writing heads is to be effected in a fast and targeted manner as well. An error caused by vibration or shock leads to a comparatively time-consuming post-adjustment, increasing the access time and reducing the data transfer rate.

The assembly is preferably produced in a hybrid injection molding method. According to a multicomponent injection molding method, typically at least two different plastic materials are injected into a mold in a hybrid injection molding method. Injection ensues successively so that initially one component, for example, the damping element, is injected into the mold. In addition, in the hybrid injection molding method, another component, the holding pin, for example, is held in the mold as an insert component. The insert component can, for example, be made of metal or another material. Upon injection of the plastic materials, the insert component becomes an integral part of the entire component such as the assembly, for example. The assembly can therefore be produced cost-effectively and in series without subsequent measures such as a manual insertion of the holding pins or the like, are required. In particular, only one closing unit is required for an injection molding facility and the assembly can be produced by one mold in only one production step.

Each damping element may have a first damping portion arranged around the respective holding pin and arranged on a side facing the plugin unit between narrow sides of the holding rail. Each damping element has a strand, in each case running to the first damping portion to at least one narrow side of the holding rail.

The first damping portion is formed essentially cylindrically or in an oval shape around the respective holding pin and can also be referred to as damping pot. The narrow sides are the sides of the holding rail arranged perpendicular to a top side of the holding rail and which fix the holding rail in the guide rail. The top side is assigned to the plugin unit and faces the plugin unit in the mounted state. The strand is formed like a channel, for example, and leads from one edge of the holding rail, i.e., a narrow side, to the first damping portion. In other words, the strand is formed as a continuous casting strand, which, as a part of the damping element, is not or not completely removed after injection molding of the damping element. The strand is molded to the first damping portion. The strand is an integral part of the damping element and therefore of the same material as the first damping portion.

It is therefore possible to produce the damping element by a hybrid injection molding method, in particular if the first damping portion has no direct connection to the edge of the holding rail, from which the first damping portion can directly be injection-molded. When injection-molding the damping element, the material of the damping element is injected from an edge of the assembly in a mold separation plane of an injection mold (molding tool). The strand allows for the first damping portion to be injection-molded, without the portion per se being located on the edge of the mold separation plane. This provides for apertures between the first damping portion and the narrow sides of the holding rail, for example, so that the holding rail can elastically be depressed between the narrow sides in these areas. Therefore, the holding rail appears to be resilient in this area so that they, in the mounted state, exert a spring force to be securely fixed on the guide rail of the installation cage. This will particularly contribute to dampen oscillations, without that the advantages of an injection molding process have to be dispensed with.

Each strand may comprise a second damping portion of the damping element formed on a side of the holding rail facing the plugin unit to dampen relative movements between the installation cage and the plugin unit. The second damping portion is part of the strand. The strand is shaped such that the second damping portion is formed. Such a damping element comprises two damping portions as integral part, and allows for production in one injection-molding operation. Therefore, in particular a large-surface, separate further damping element can be omitted.

The second damping portion is particularly suitable for damping lateral angular and/or lateral accelerations. In particular in the case of assemblies with multiple plugin units, for example, storage drives arranged next to one another or above one another within the installation cage, transmission of mechanical oscillations between the plugin units is minimized or prevented. For example, a so-called rocking effect or angular acceleration effect produced when oscillations of a plugin unit are transferred to one or multiple other plugin units is reduced or even prevented. This is also referred to as "mechanical visibility" and is in particular advantageous for "business critical applications" or "business-critical hard disk drives," respectively. In such assemblies or hard drives, a particularly low susceptibility to errors is expected, as hard disk drives in such applications usually are to be in operation continuously and without interruption.

Each strand may comprise two second damping portions. This contributes to a particularly good oscillation damping. For example, the two second damping portions are configured separate from one another so that a plugin unit is supported on both damping portions during operation. In this way, tilting movements, for example, of the plugin unit can be damped.

One or both second damping portions may be convexly shaped. In this way, manufacturing tolerances can be corrected. Furthermore, essentially a linear support or a support with a very small surface of the plugin unit on the damping portion(s) is allowed. This contributes to a particularly small support surface of the plugin unit on the second damping portions, effectively dampening oscillations. For example, the convex shape contributes to compensate for tolerances when orientating the assembly and the plugin unit to one another. When the assembly (in particular the holding rail) and the plugin unit are not arranged exactly parallel to one another, such as parallel to a plug-in direction of the assembly with the plugin unit, this will not have a negative effect on the degree of deformation of the second damping portion. For example, the support surface or linear support of the second damping portion(s) runs perpendicular to a plug-in direction of the assembly and parallel to a side of the holding rail facing the plugin unit.

Each strand may initially extend from the corresponding first damping portion parallel to a main extension direction of the holding rail and then perpendicular to each narrow side. For example, a second damping portion is in each case provided in the perpendicular portions of the strand, respectively. In other words, the strand is formed in the shape of an anchor or a T.

Each first damping portion may have peaks formed such that a height of the peaks is compressed by 30% at the most in a direction parallel to a rotational axis of the corresponding holding pin in an installed state of the assembly compared to an uninstalled state of the assembly. The compression is ensured by nominal measure in consideration of the tolerances. Based on the nominal measures of the individual components of the assembly, of the plugin unit, as well as of the installation cage, a nominal compression of 15% of the first damping portion is set in the installed state of the plugin unit with the assembly. Due to tolerances of the components, for example, compression discrepancies in plus or minus 12.5% of the normal compression result. This way, a maximum compression of 27.5% or at least 2.5%, and thus a compression interval of 25% results, for example. A total compression of 30% constitutes a maximum threshold, for example, which is not to be exceeded, since a too high compression of the material of the first damping portion or of the damping element would be achieved. This would counterbalance the damping properties of the damping element.

At this point, basically always a minimum compression of the damping element or of the first damping portion is required and ensured to contribute to the dampening of oscillation.

The holding rail for each first damping portion may comprise a receiving area configured in the form of a web and may comprise a thinned web. This particularly contributes to noise damping. For example, it is thereby achieved that a noise level oscillation-induced by the plugin unit is held below 18 dB (decibel).

We also provide a method of producing an assembly according to one of the preceding claims. The method comprises the steps:
providing a two-part mold for the assembly;
inserting two holding pins into a respective mold halve;
closing the mold;
displacing one or more sliders for forming a first cavity in the mold, which defines a shape of a holding rail;
injecting a first plastic material into the first cavity for producing the holding rail; displacing the one or more sliders for forming two further cavities in the mold, each predefining a shape of a damping element; and
injecting a second plastic material into each further cavity for producing in each case one damping element, wherein each further cavity is formed such that a damping element produced therein forms a non-detachable connection with the respective holding pin and the holding rail.

The method essentially allows for the aforementioned advantages and functions. It is thus possible to produce all above-described configurations of the assembly.

Further functions and advantages are disclosed in the following detailed description of an example.

The example is described using the attached figures. Like or similar components are indicated with the same reference numerals throughout the drawings.

Modern storage drives have two lateral fastening openings since, due to a higher storage capacity, installation space is required. So that such storage drives, which typically have a higher weight compared to storage drives of a smaller capacity (e.g., up to 790 g or more), are securely held in an installation cage of a computer housing, pass the above mentioned fall-tests and effectively effect oscillation damping, an improved assembly 1 shown in FIGS. 2 to 8 is described.

Figure 2:
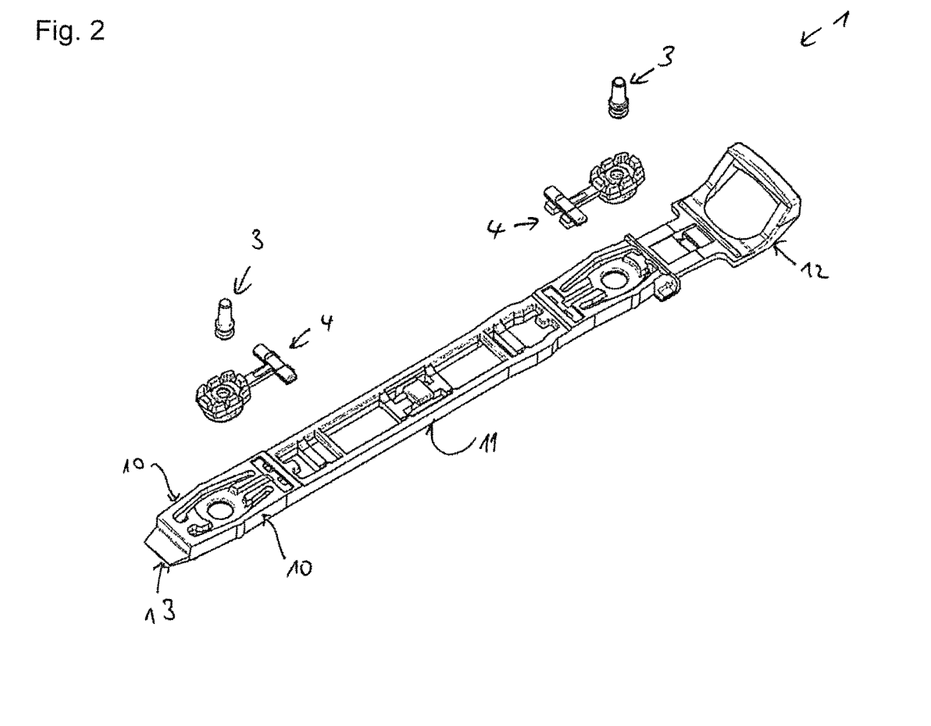
FIG. 2 shows a schematic, perspective exploded view of an assembly according to a first example.

FIG. 2 shows an exploded view of an assembly 1 according to an example. The assembly 1 is adapted to be arranged on a lateral surface 7 of a plugin unit 6 shown in FIG. 3. The plugin unit 6 is a hard disk drive having a storage capacity of 6 Terabytes. Alternatively, the plugin unit 6 is an optical drive. The plugin unit 6 has in each case merely two fastening openings 8 on opposite lateral surfaces 7. The assemblies 1 respectively consist of one holding rail 2, merely two holding pins 3 as well as merely two damping elements 4.

Figure 3:
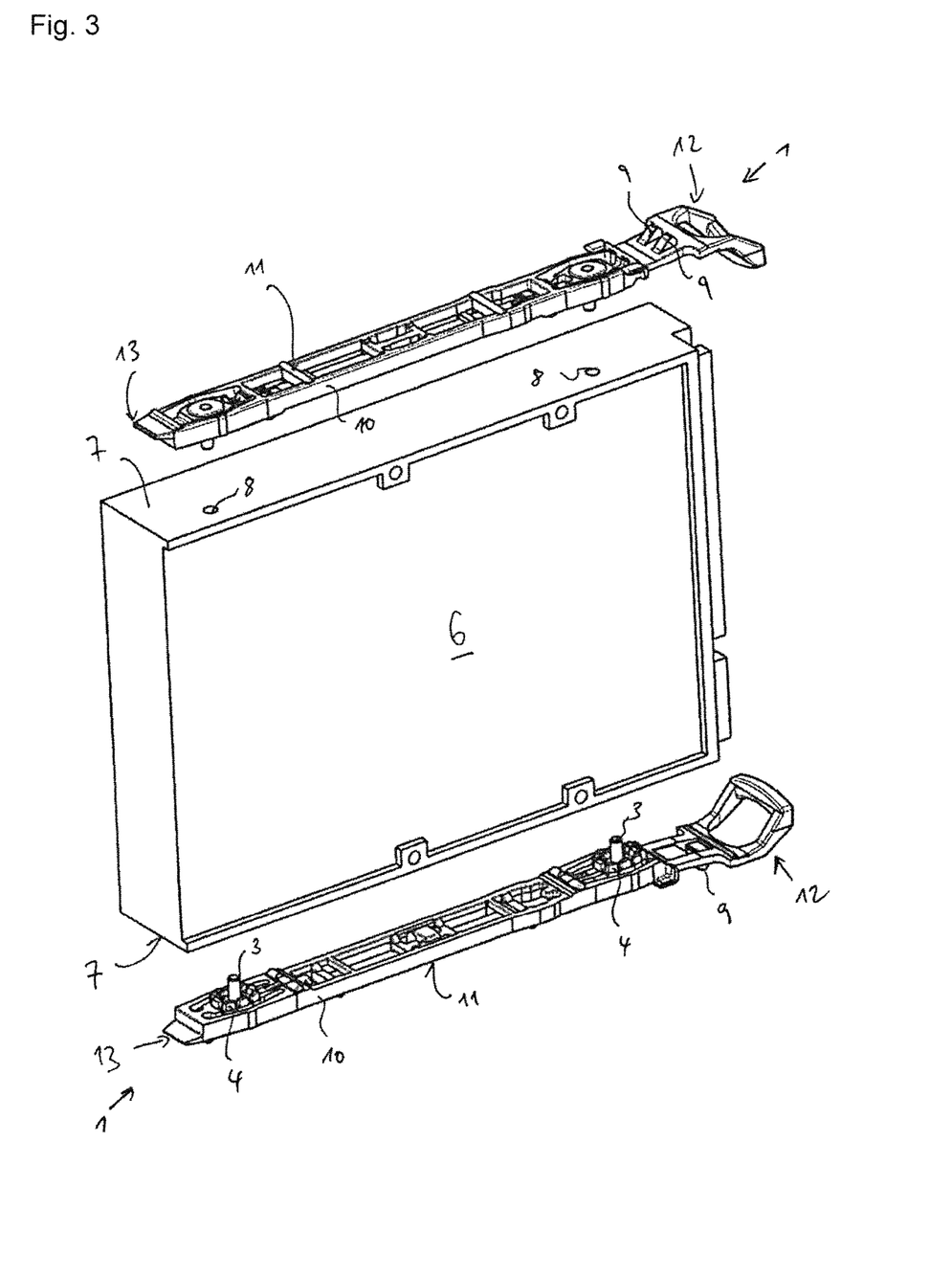
FIG. 3 shows a perspective view of a plugin unit with two assemblies according to the first example.

To introduce the plugin unit 6 in an installation cage of a computer system (not illustrated), first the assemblies 1 are plugged onto the plugin unit 6 such that the holding pins 3 engage into the fastening openings 8. Together with the assemblies 1 fixed or plugged-in in that way, the plugin unit 6 is inserted into the installation cage and thereby mechanically fixed. For example, each holding rail latches with the installation cage by latching lugs 9. In the example, each holding rail 2 is elongated. Each holding rail 2 has support surfaces on opposite narrow sides 10, by which each holding rail 2 is fixed in a vertical direction in the installed or inserted state between guide elements of the installation cage. The guide elements are a guide rail, for example. Further support surfaces are provided on a wider lateral surface 11 of each holding rail 2 facing away from the plugin unit 6 so that each holding rail is also fixed in the installation cage in a horizontal direction, too, in an installed or respectively inserted state.

A handle element 12 is formed on one end of each holding rail 2, which releases a latching connection of the holding rail 2. One end of each holding rail 2 opposite the handle element 12 is configured as a guide tip 13 for additional fixation of the holding rail 2 in the installation cage.

In the example, a holding rail 2 consists of a polypropylene plastic. Another plastic material is possible as well, however. For example, each holding pin 3 is produced from a rigid plastic material such as Acrylonitrile butadiene styrene/Polycarbonate-blend (ABS/PC). Alternatively, the holding pin 3 is produced from another material such as ABS or a metal material. Each damping element 4 consists of an Isoloss or Isodamp plastic material of the E.A.R. AERO Technologies (Indianapolis, USA). Such a plastic material is particularly suitable for damping vibrations. Alternatively, a thermoplastic elastomer, TPE for short, for example, by the Kuraray company (Tokyo, Osaka, Japan, or respectively Hattersheim am Main, Germany) can be used.

Figure 7:
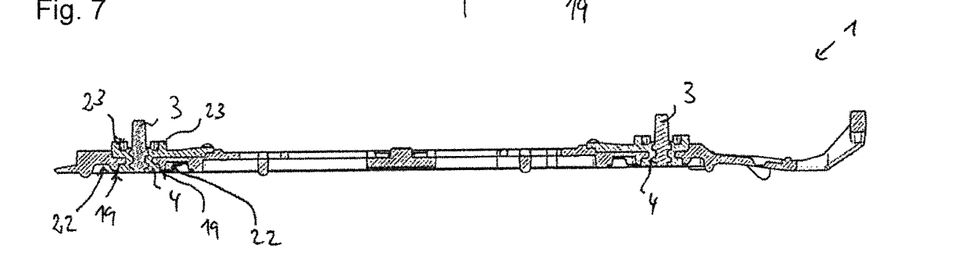
FIG. 7 shows another sectional illustration.
Figure 8:
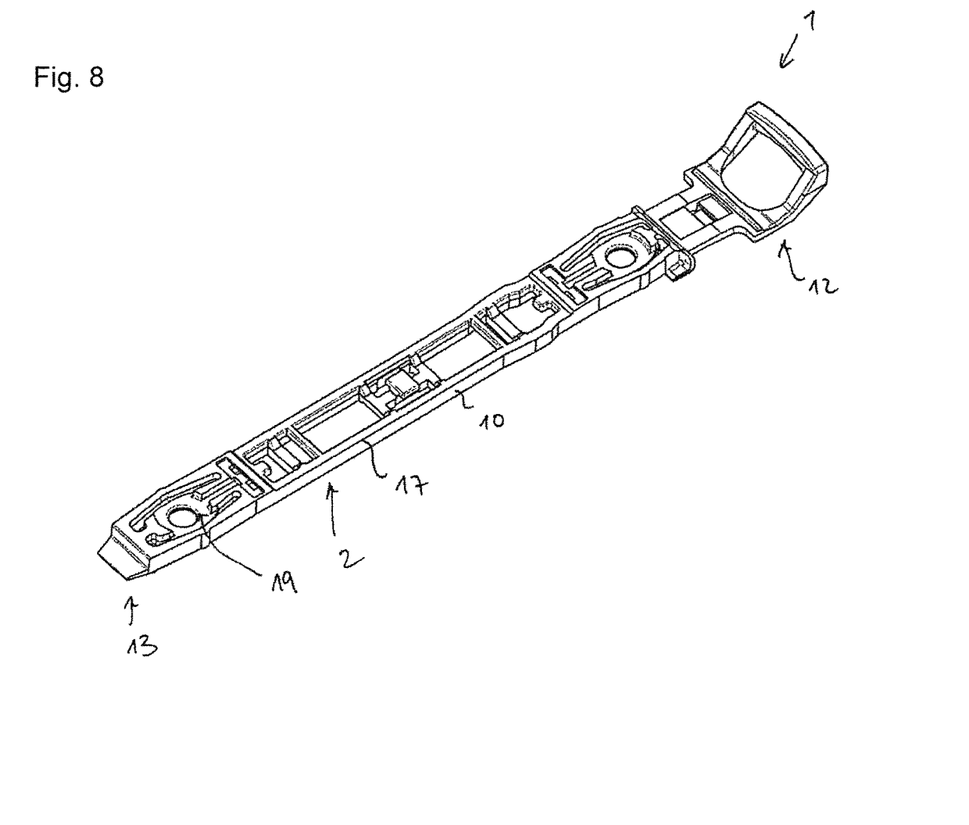
FIG. 8 shows a perspective view of a holding rail of the assembly.
Figure 9:
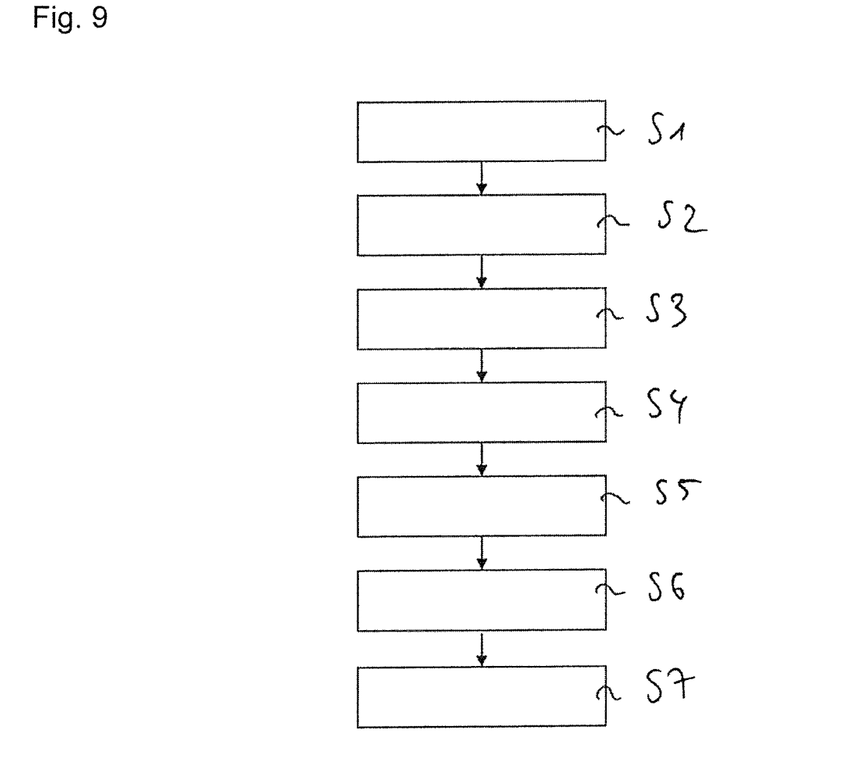
FIG. 9 shows a schematic flow diagram for producing an assembly.

The assemblies 1 according to FIGS. 2 to 8 are in each case produced integrally in a hybrid injection molding method, which is described using a schematic flow diagram according to FIG. 9.

In a first step S1, a two-part mold for a hybrid injection molding facility is provided.

In a second step S2, both holding pins 3 are inserted into a corresponding halve of the mold.

In a further step S3, the mold is closed.

In a further step S4, one or more sliders are displaced within the mold so that a first cavity predefining a shape of the holding rail 2 is formed in the mold.

In the next step, S5, a first plastic material is injected into the first cavity so that the guide rail 2 is formed.

In a sixth step, S6, one or more sliders for forming two further cavities in the mold are displaced, each predefining a shape of a damping element 4.

In a seventh step, S7, a second plastic material different from the first plastic material, is injected in every second cavity to produce in each case one damping element 4. Every second cavity is shaped such that the damping element 4 produced therein forms a non-detachable connection to the respective holding pin 3 and the holding rail 2. The assembly 1 is therefore produced in one piece.

By the described method of producing the assembly 1, it is possible to produce the assembly 1 having the above described advantages and functions.

The integral design of the assemblies 1 ensures that despite omitting the intermediate holding pin 3 as shown in FIG. 1, plugin units 6 can be fixed in an installation cage with sufficient mechanical security. The damping elements 4 are non-detachably connected to the holding pins 3 and the holding rail 2.

Figure 4A:
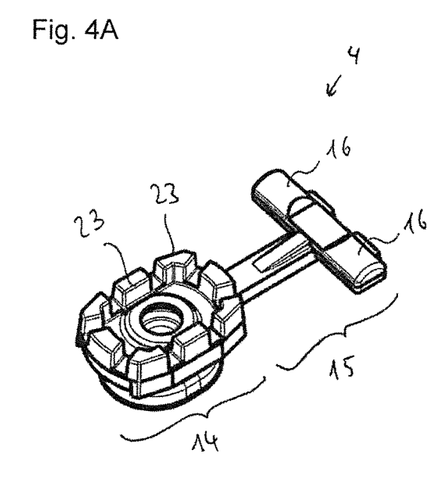
FIGS. 4A and 4B show perspective views of a damping element of the assemblies.
Figure 4B:
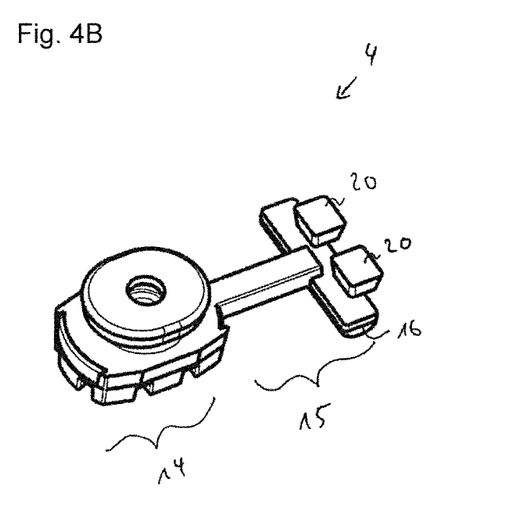

As described in FIGS. 4A and 4B, each damping element 4 has a first damping portion 14 and a strand 15, wherein two second damping portions 16 are formed in the strand 15.

Figure 5:
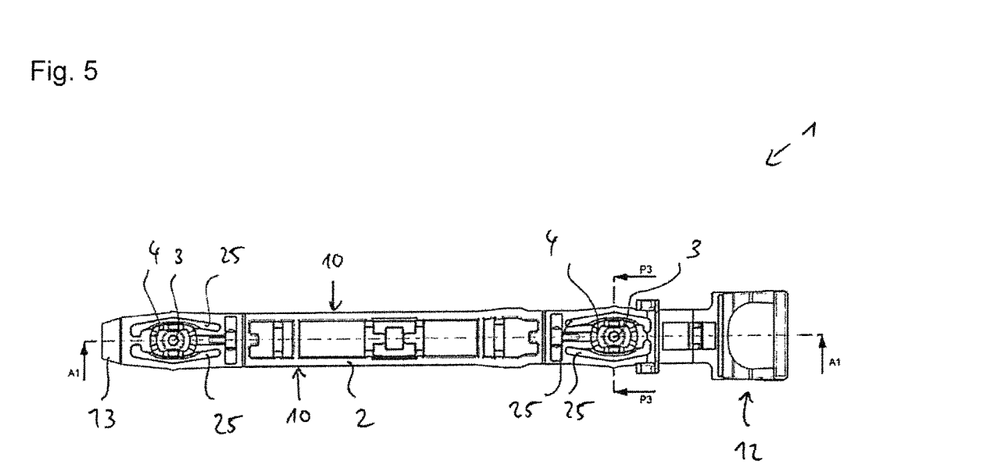
FIG. 5 shows a top view of an assembly.

The first damping portion 14 is arranged intermediately between the opposite narrow sides 10 of the respective holding rail 2 (see FIG. 5). To be able to produce the first damping portion 14 in a hybrid injection molding method, it is necessary to provide the strand 15 so that when injection molding the damping element 4, the material can enter into the respective area for molding around the holding pin 3. The strand 15 functions as a continuous casting strand constituting a part of the damping element 4. Injection typically ensues in a mold separation plane of an injection mold from the edge 17 of the holding rail 2.

The strand 15 initially runs parallel to a middle longitudinal axis 18 of the holding rail 2 (parallel to the insertion direction of the assembly 1 into the installation cage) and subsequently perpendicular to the two narrow sides 10. The middle length axis 18 is parallel to a main extension plane of the holding rail 2. In the perpendicular portion of the strand 15 the two second damping portions 16 are formed, respectively having a convex shape. The second damping portions 16 are configured such that in the assembled state of the assemblies 1 in the installation cage, they are in contact with the lateral surfaces 7 of the plugin unit 6. Due to the convex shape, an essentially line-type contact to the plugin unit 6 is established. This allows for a particular good absorption of the above-mentioned angular accelerations and tilting forces. The damping elements 4 are formed minor-symmetrically and are also arranged mirror-symmetrically relative to the longitudinal middle axis 18. This contributes to a particular good vibration damping.

The strand 15 allows for injecting the first damping portions 14 between the narrow sides 10, wherein breakthroughs 25 are provided around the first damping portions 14. Therefore, the injection point is arranged on the edge 17 at a spatial distance to the first damping portions. The breakthroughs 25 allow for a spring effect to fix the holding rail 2 in the guide elements. If the first damping portion 14 would be injected the shortest way (directly from the edge 17) at least one breakthrough 25 had to be dispensed with in each damping element 4.

Figure 6:
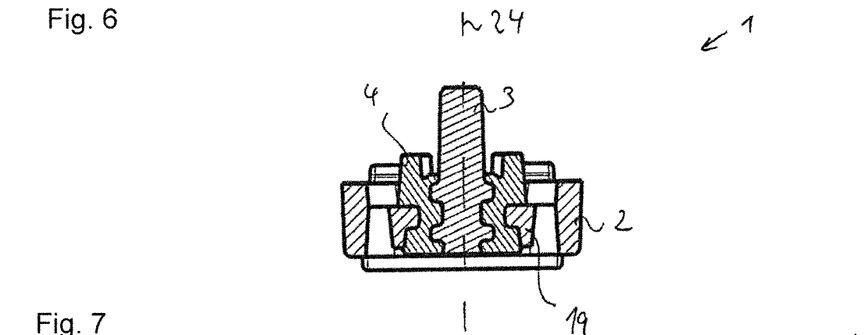
FIG. 6 shows a sectional illustration of the assembly.

For secure mechanical fixing of the damping element 4 to the respective holding pin 3, the first damping portion 14 is molded around the respective holding pin 3. This is, for example, illustrated in FIG. 6, illustrating a sectional view through a holding pin 3 pursuant to the sectional plane P3-P3 drawn in FIG. 5. The holding pin 3 comprises a groove limited by two radially-circumferential protrusions so that a correspondingly stable mechanic connection develops when molding around the damping element 4. Furthermore, the damping element 4 per se enters into a respective mechanical connection with a receiving area 19 of the holding rail 2 during the molding process. This ensures a particularly safe mechanical securing of the holding pin 3 on the damping element 4 and furthermore on the holding rail 2.

The strand 15 further comprises two fastening protrusions 20 on a lower side of the damping element 4 (see FIG. 4B).

The fastening protrusions 20 engage with corresponding undercuts 21 of the holding rail 2, as they are shown in FIG. 8. These are therefore molded to the holding rail 2. The shape of the fastening protrusions 20 prevents detachment of the strand 15 from the holding rail 2. This achieves a non-detachable connection. Such a mechanical connection is essentially only possible due to the injection molding process and could not be assembled by hand. This ensures that the strand 15 cannot be detached from the holding rail 2.

FIG. 7 illustrates a longitudinal section according to the sectional course A1-A1 illustrated in FIG. 5. The damping element 4 mechanically connects to the first damping portion 14 in the receiving area 19 with the holding rail 2. The receiving area 19 is formed web-like, comprising thinned web portions 22. The web portions 22 have a thickness of 1.5 mm or less, for example. This particularly contributes to damping vibrations and in particular to reduced noise.

The first damping portions 14 have peaks 23, which are depressed during operation to dampen vibrations and mechanical loads. The peaks 23 are configured such that a height of them is depressed by at most 30%, preferably 25%, relative to a rotation symmetrical axis 24 of the respective holding pin 3.

The invention claimed is:

1. An assembly for fixing a plugin unit in an installation cage of a computer system comprising:
   a holding rail with a support surface that fixes the holding rail in a guide rail of the installation cage; and
   two holding pins that engage in lateral fastening openings of the plugin unit and fix the holding rail to the plugin unit,
   wherein
   each holding pin is mechanically coupled with the holding rail via a damping element;
   the assembly is formed integrally,
   each damping element is molded to the corresponding holding pin and the holding rail in a non-detachable manner by an injection molding method, and
   every damping element comprises a first damping portion molded around the corresponding holding pin and arranged on a side facing the plugin unit between narrow sides of the holding rail, and the damping element comprises a strand that respectively runs from the first damping portion to at least one narrow side of the holding rail.

2. The assembly according to claim 1, produced in one piece in a hybrid injection molding method.

3. The assembly according to claim 1, wherein each strand comprises a second damping portion of the damping element, which is configured to dampen relative movements between the installation cage and the plugin unit on a side of the holding rail facing the plugin unit.

4. The assembly according to claim 1, wherein each strand comprises two second damping portions.

5. The assembly according to claim 1, wherein one or both second damping portions are convexly formed.

6. The assembly according to claim 1, wherein each strand extends from the respective first damping portion initially parallel to a main extension direction of the holding rail and subsequently perpendicular in direction to each narrow side.

7. The assembly according to claim 1, wherein each first damping portion comprises peaks formed such that in an installed state of the assembly, a height of the peaks is compressed by 30% at the most in a direction parallel to a rotational axis of the respective holding pin compared to an un-installed state of the assembly.

8. The assembly according to claim 1, wherein the holding rail has a receiving area for each first damping portion formed web-like and has a thinned web portion.

9. A method of producing the assembly according to claim 1, comprising:
   providing a two-part mold for the assembly;
   inserting two holding pins into a respective mold halve of the mold;
   closing the mold;
   displacing one or more sliders to form a first cavity in the mold defining a shape of a holding rail;
   injecting a first plastic material into the first cavity to produce the holding rail;
   displacing the one or more sliders to form two further cavities in the mold, each defining a shape of a damping element; and
   injecting a second plastic material in each further cavity to produce in each case one damping element, wherein each further cavity is formed such that a damping element produced therein forms a non-detachable connection to the respective holding pin and the holding rail.

* * * * *